(12) United States Patent
Aronovich

(10) Patent No.: US 11,036,563 B2
(45) Date of Patent: Jun. 15, 2021

(54) DEADLOCK RESOLUTION BETWEEN DISTRIBUTED PROCESSES USING PROCESS AND GROUP INFORMATION

(71) Applicant: INTERNATIONAL BUSINESS MACHINES CORPORATION, Armonk, NY (US)

(72) Inventor: Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 16/358,403

(22) Filed: Mar. 19, 2019

(65) Prior Publication Data

US 2020/0301757 A1   Sep. 24, 2020

(51) Int. Cl.
*G06F 9/52* (2006.01)
*G06F 9/50* (2006.01)
*G06F 9/48* (2006.01)

(52) U.S. Cl.
CPC ............ *G06F 9/524* (2013.01); *G06F 9/4887* (2013.01); *G06F 9/5038* (2013.01)

(58) Field of Classification Search
CPC ....................................................... G06F 9/524
See application file for complete search history.

(56) References Cited

U.S. PATENT DOCUMENTS

| 5,440,743 A * | 8/1995 | Yokota ..................... G06F 9/524 710/200 |
| 5,991,793 A * | 11/1999 | Mukaida ................ G06F 9/5011 718/104 |
| 6,782,537 B1 * | 8/2004 | Blackmore ............. G06F 9/524 718/106 |
| 2004/0025164 A1 * | 2/2004 | Ma .......................... G06F 9/524 718/107 |
| 2009/0015860 A1 * | 1/2009 | Jahn ........................ G06Q 10/06 358/1.15 |
| 2009/0300634 A1 * | 12/2009 | Ramsey .............. G06F 9/30127 718/104 |
| 2017/0003972 A1 * | 1/2017 | Elliott ....................... G06T 1/20 |

\* cited by examiner

*Primary Examiner* — Benjamin C Wu
(74) *Attorney, Agent, or Firm* — Griffiths & Seaton PLLC

(57) ABSTRACT

A system for resolving a resource deadlock between processes. The processes are configured to belong to process groups. Resources are allocated on behalf of the process groups to be assigned to respective processes within the process groups. A shared data structure is maintained that includes process records of each of the processes. A determination is made that a respective process is involved in a resource deadlock if the process group to which the process belongs to is involved in the resource deadlock.

18 Claims, 9 Drawing Sheets

DEADLOCK RESOLUTION BETWEEN DISTRIBUTED PROCESSES USING PROCESS AND GROUP INFORMATION

BACKGROUND OF THE INVENTION

Field of the Invention

The present invention relates in general to computing systems, and more particularly, to various embodiments for resolving resource deadlocks between processes in distributed computing environments.

Description of the Related Art

In distributed computing architectures, a resource deadlock occurs when a process is unable to secure a resource that the process needs to complete or to initiate. The resource deadlock may thus occur, for example, when a first process requires a resource held by a second process, which is waiting for a resource held by the first process. This scenario prevents either process from completing. In another scenario, multiple processes may be allocated shared resources from a resource scheduler, however the resources may be allocated in a number that is lower than a minimum number of resources that one of the multiple processes requires to commence workload execution. In this way, the processes may experience undesirable latency prior to the initiation of the process' workload. Deadlocks, in essence, dramatically hinder system performance by squandering resources needed to fulfill other requests.

SUMMARY OF THE INVENTION

Various embodiments for resolving a resource deadlock between processes are provided. In one embodiment, a method comprises configuring the processes to belong to process groups; allocating resources on behalf of the process groups to be assigned to respective processes within the process groups; maintaining a shared data structure that includes process records of each of the processes; and determining that a respective process is involved in a resource deadlock if the process group to which the process belongs to is involved in the resource deadlock.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
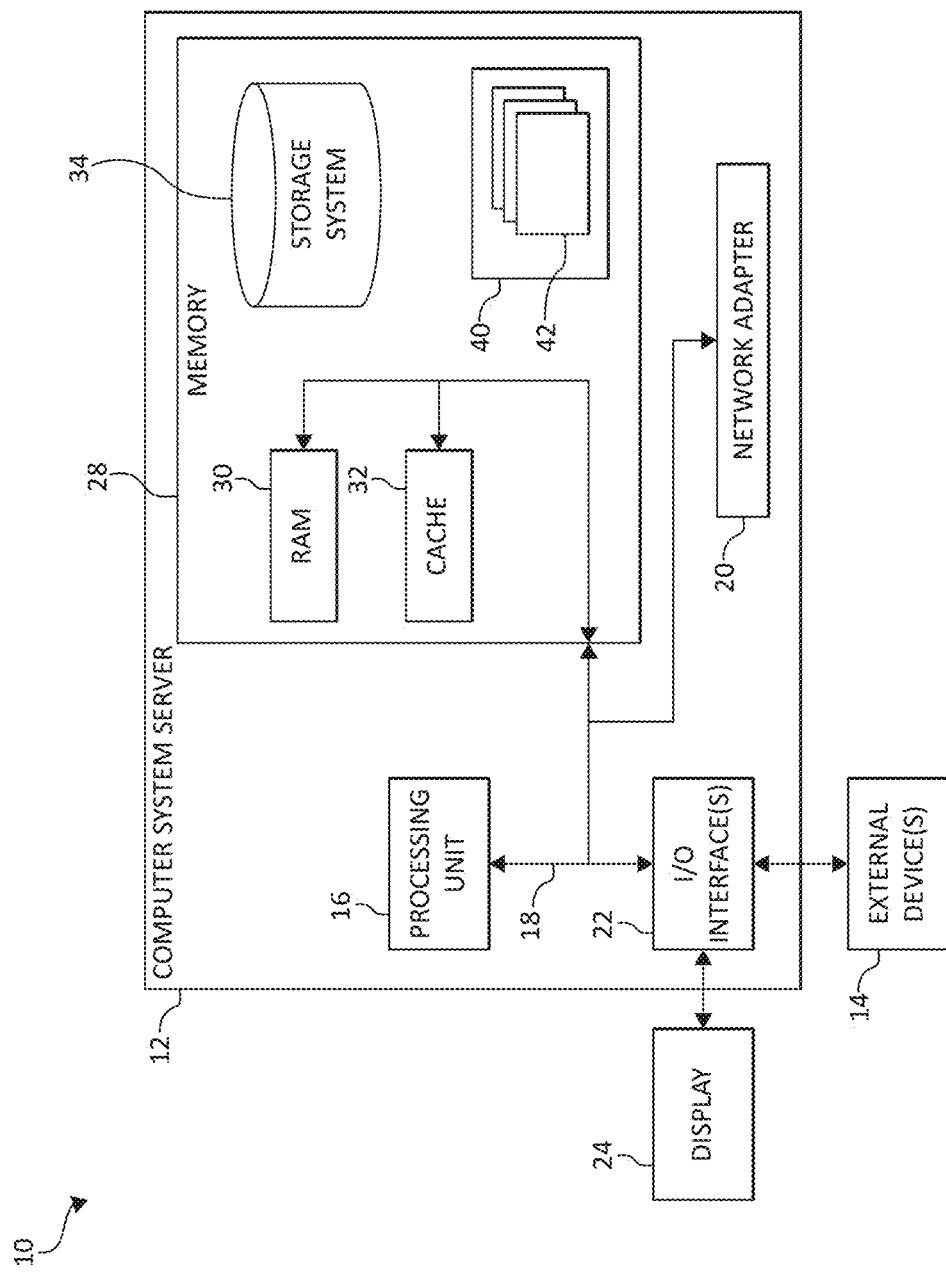
FIG. 1 is a block diagram depicting an exemplary computing node, according to embodiments of the present invention.

As previously mentioned, in distributed computing architectures, a resource deadlock occurs when a process is unable to secure a resource that the process needs to complete or to initiate. The resource deadlock may thus occur, for example, when a first process requires a resource held by a second process, which is waiting for a resource held by the first process. This scenario prevents either process from completing. In another scenario, multiple processes, each requiring exclusive resources, may be allocated shared resources from a resource scheduler, however the resources may be allocated in a number that is lower than a minimum number of resources that one of the multiple processes requires to commence workload execution due to resource exhaustion (i.e., no additional free resources are available to allocate). In this way, the processes may experience undesirable latency prior to the initiation of the process' workload.

Prior implementations have been considered in attempt to detect resource deadlocks, however these implementations generally fail to actually resolve the deadlock once it occurs. For example, in path pushing algorithms, distributed deadlocks are detected by maintaining an explicit global Wait-For-Graph (WFG). Each site maintains a local WFG, and when a deadlock computation is performed, a respective site sends its local WFG to all the neighboring sites. Each site that receives a WFG from another site combines the received WFG with its local WFG to build an updated WFG, and passes this updated WFG to other sites. The procedure is repeated until a given site has a sufficiently complete picture of the global state to determine that a deadlock exists or to establish that no deadlocks are present.

In another example, namely in edge-chasing algorithms, the presence of a cycle in a WFG is detected by transmitting and propagating messages called probes, along the edges of the graph. The formation of a cycle is detected by a site if it receives back a probe message sent by the site previously. When a process that is executing receives a probe message, it discards this message and continues. Thus, only blocked processes propagate probe messages along their outgoing edges in the graph, to the processes they depend on.

In another example, namely in global state detection algorithms, a consistent snapshot of a distributed system is obtained without freezing the underlying computations, and the snapshot is examined for the condition of a deadlock, as deadlock is a stable property.

In still another example, namely in diffusion computation algorithms, deadlock detection computation is diffused through the WFG of the system. Echo network messages are used to detect deadlocks. To detect a deadlock, a process sends out messages along all the outgoing edges in the WFG. These messages are successively propagated (i.e., diffused) through the edges of the WFG. If an active process receives an echo query or reply message, it discards it. When a blocked process receives a first query message for a particular deadlock detection initiation, it does not send a reply message until it has received a reply message for every query the process sent. For all subsequent queries for this deadlock detection initiation, the process immediately sends back a reply message. Thus, the initiator detects a deadlock when it receives reply for every query it had sent out.

While, again, these prior mechanisms focus on deadlock detection between processes, they fail to provide functionality which ultimately resolves the deadlock in a meaningful way so as to efficiently enable deadlocked resources to be allocated to respective processes to commence or conclude execution. Accordingly, the functionality of the present invention proposes techniques to resolve deadlock situations by selecting processes having a lower priority to release currently assigned resources while instructing other processes having a higher priority to claim resources, therefore obtaining released resources. The considered system also includes functionality to share information between the processes using a shared data structure to enable a collective and collaborative decision among the processes as to which processes release resources and which processes claim the released resources. The shared data structure may reside on any type of shared infrastructure, such as a shared file system or another form of shared data storage, as will be discussed.

The functionality described herein is distinguishable to existing methods because these methods assume that it's possible to construct the described WFG, which for each process identifies the specific other processes that the process waits for in terms of resource usage. Utilizing the mechanisms of the present invention, a process does not have access to information on which other processes are blocking resource allocations thereto, such that a WFG cannot be constructed on the process level. Furthermore, in a generic case of scarce resources that may be used by many or most of the processes, a WFG may provide less informative information as each blocked process may be practically waiting on all other blocked processes.

Existing methods also tend to rely on network messaging, and specifically on the ability of each process to send network messages to other processes. This requires each process to have information that enables the creation of network connections with other processes, and also have information on which other processes are blocking this process. The present invention does not assume the availability of this information for the processes, and does not require transmission of network messages. Moreover, many of the existing methods assume that the information on how processes are grouped within sites is known and available for each of the processes and each of the sites. The functionality of the present invention, conversely, does not assume the availability of this information for the processes and sites, and does not require the existence nor use of this information.

Finally, many of the existing methods assume that there is a deadlock detection logic implemented in additional layers other than the processes themselves (e.g., in a layer of a site that is grouping processes, or a global layer that includes all the sites and processes). The mechanisms of the present invention do not assume that there is a deadlock detection logic implemented anywhere other than the processes themselves, which are generally independent of each other.

The proposed mechanisms disclosed herein may be implemented in a variety of architectures, systems and the like. In one considered architecture, by way of example only, multiple processes exist that use resources that are shared between the processes. Usage of the shared resource can be exclusive to each process. In some embodiments, the processes may run on multiple hosts (i.e., a distributed processes), where each process may request resources from a resource scheduler. Each process therefore may specify to the scheduler the number of resources it requires, and waits until the scheduler assigns the required resources to the process. In some embodiments, each process may have a minimum number of resources of each type that are required to start its operation. In some embodiments, the scheduler provides resources to each process one-by-one, as resources become available and according to scheduling logic implemented in the scheduler.

In some embodiments, the processes have limited connectivity with each other. Specifically, the processes do not have information to enable network connectivity with each other. In some embodiments, the processes have shared data storage, and are independent (i.e., have no knowledge) of each other. In some embodiments, there may not exist a central component available to track resource deadlocks between processes. Namely deadlock detection and resolution are under the responsibility of the processes. In some embodiments, the processes optionally have priority assigned to them.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
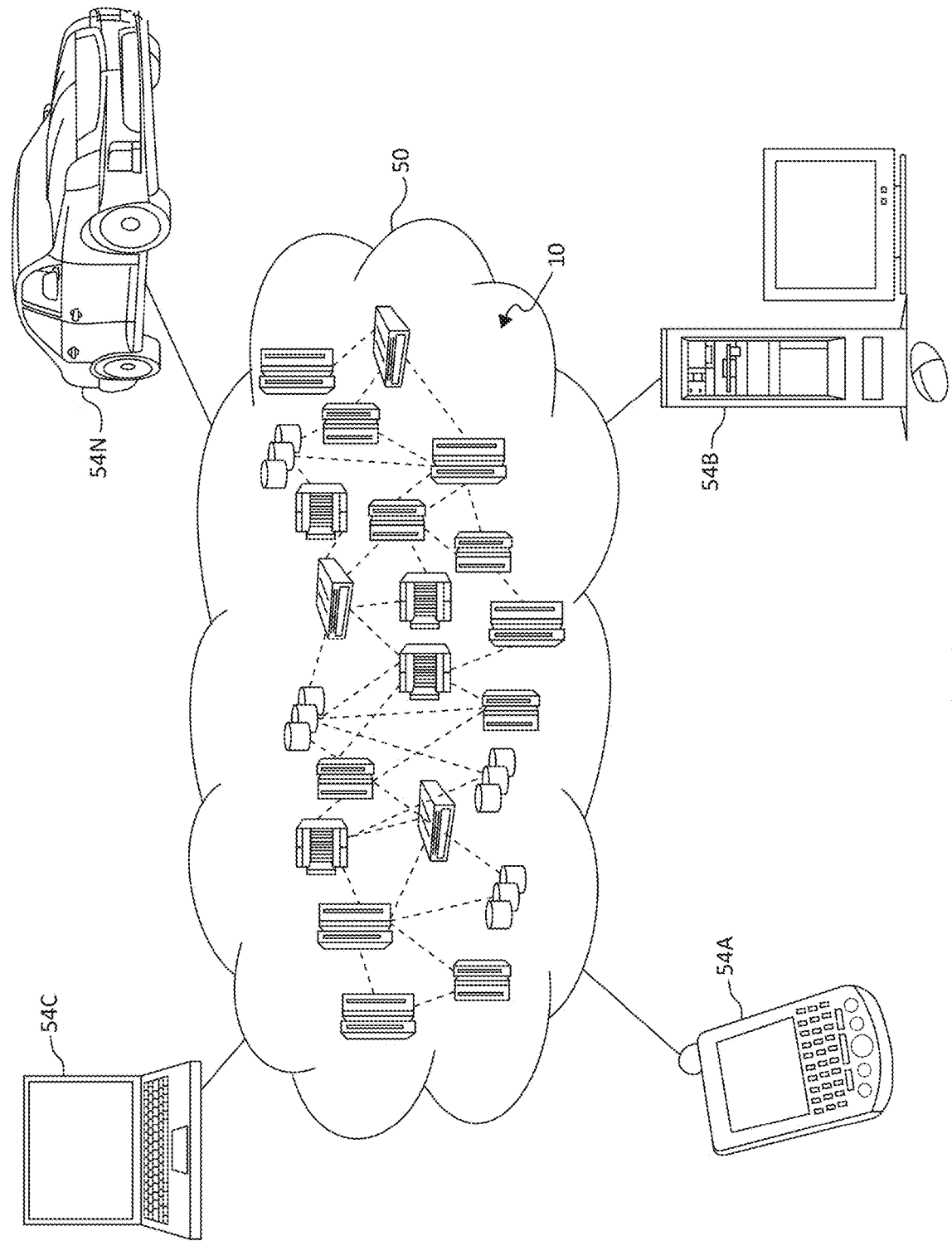
FIG. 2 is a block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
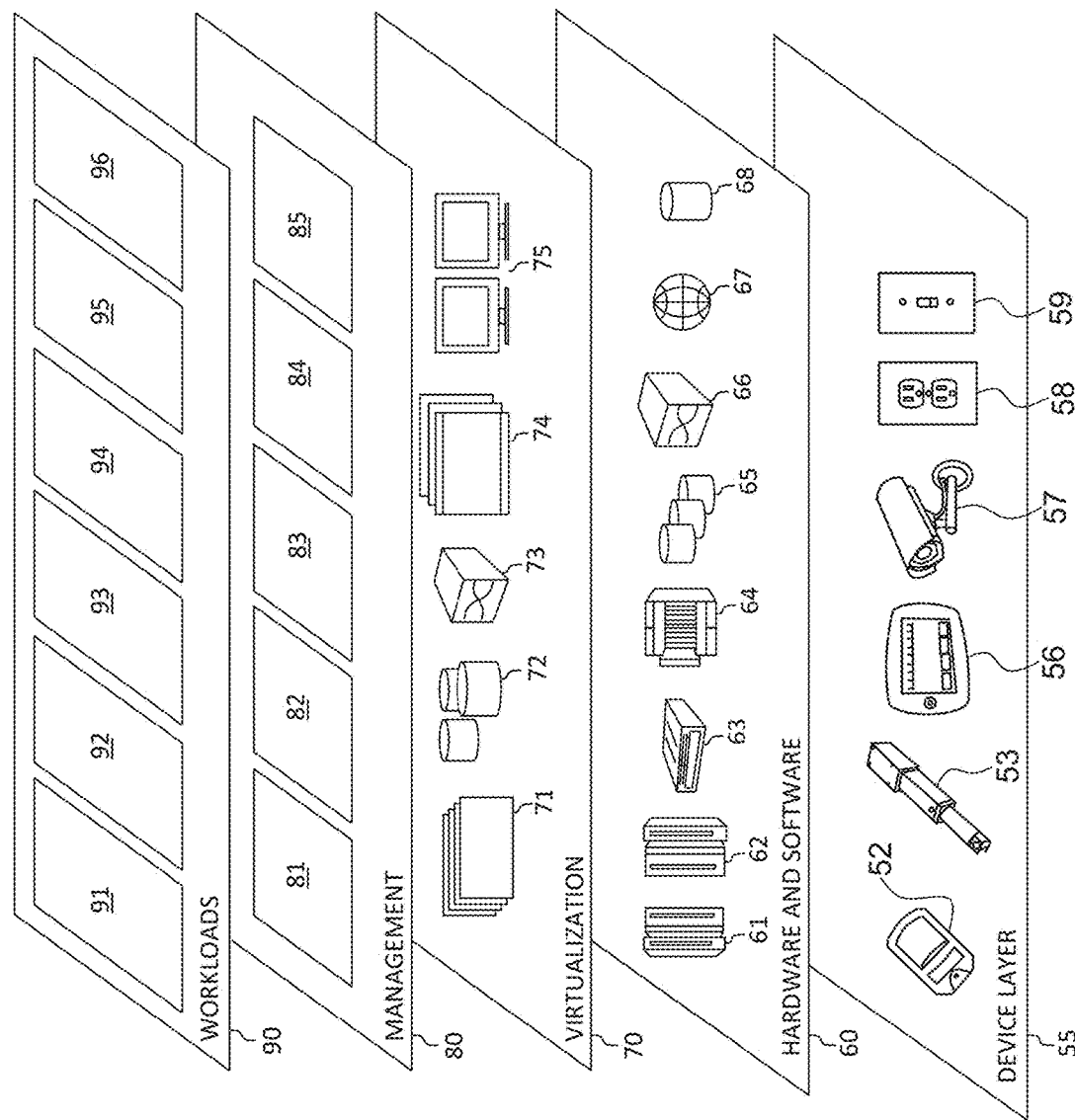
FIG. 3 is a block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, deadlock resolution algorithmic functions 96. One of ordinary skill in the art will appreciate that the deadlock resolution algorithmic functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
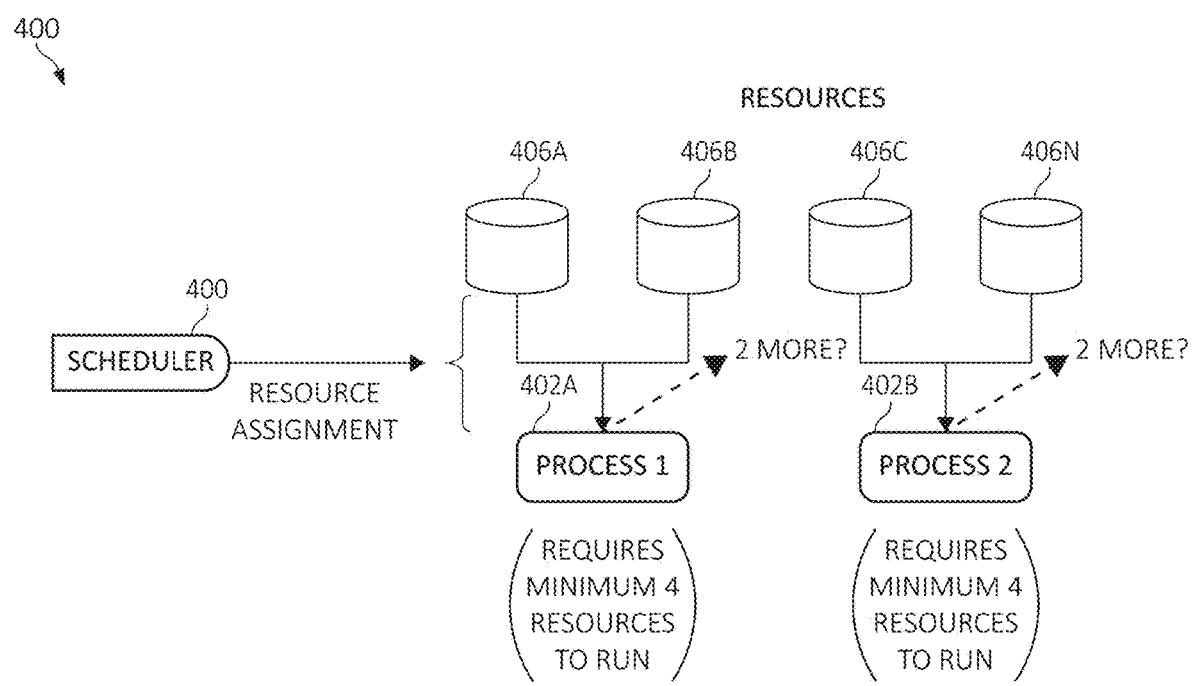
FIG. 4 is a block diagram depicting a scheduling architecture for allocating resources to processes, according to embodiments of the present invention.

Turning now to FIG. 4, a block diagram depicting a scheduling architecture 400 for allocating resources to processes is illustrated. As previously mentioned, a resource deadlock may occur in a generic case as described in architecture 400. The architecture 400 includes a scheduler 404 which allocates shared resources 406A, 406B, 406C, and 406N (collectively referred to as resources 406A-N) to processes 402A and 402B. The deadlock may occur when the processes 402A and 402B require to use the shared resources 406A-N in an exclusive way (e.g., exclusive to the process), however the scheduler 404 may only allocate the shared resources 406A-N to the respective process 402A and 402B in a number that is lower than their minimum number of required resources that enables the respective process 402A and 402B to commence execution (e.g., processes 402A and 402B may each need 4 resources of the shared resources 406A-N to commence work, yet only 2 resources are assigned to each by the scheduler 404).

Optimally, the deadlock should be resolved in a minimal time period; and events of respective processes releasing their assigned resources 406A-N should be minimized such that releasing assigned resources occurs only when deadlock is detected and only by selected processes. Optimally, a deterministic resolution of deadlock situations is used without possibility of further collisions on acquiring resources; and with no starvation of processes.

Figure 5:
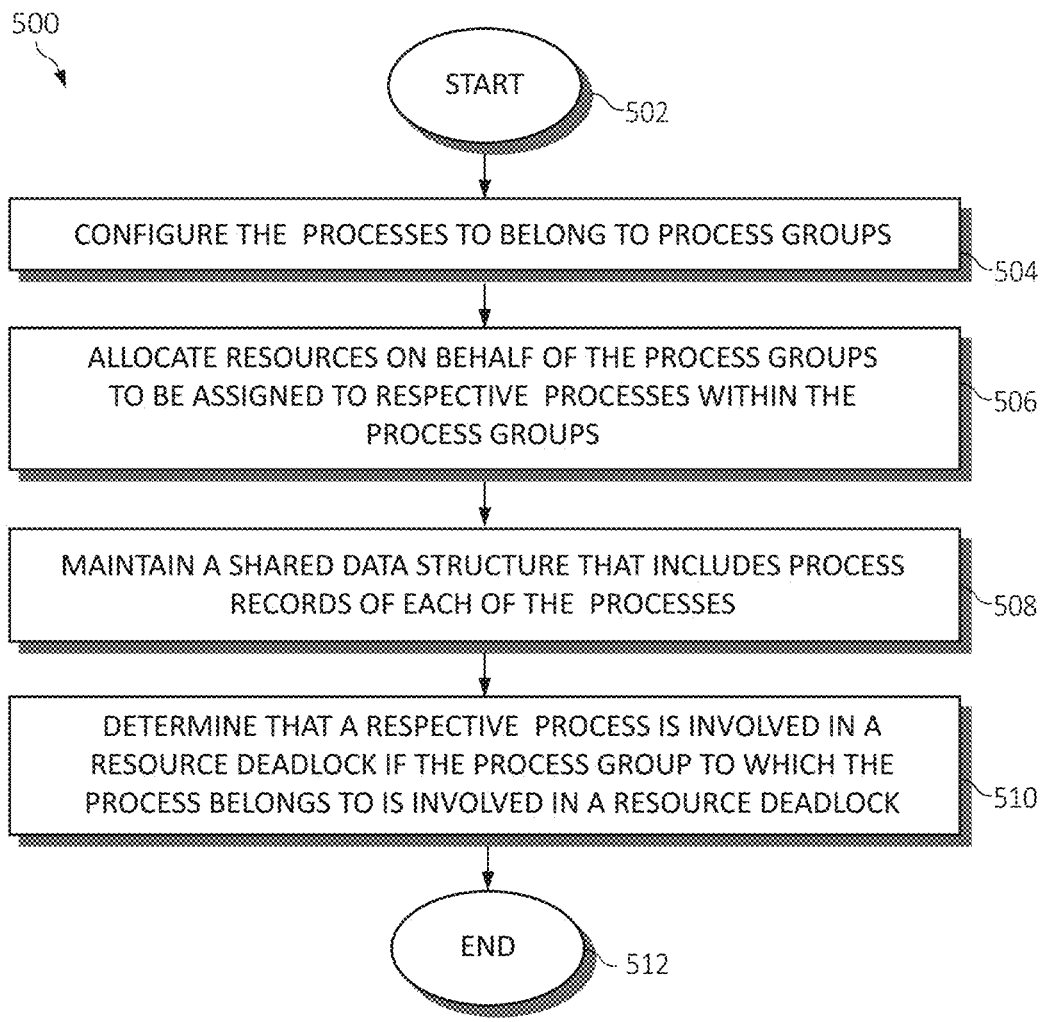
FIG. 5 is a flow chart diagram depicting a method for resolving a resource deadlock between processes, according to embodiments of the present invention.

Accordingly, the present invention introduces novel techniques to resolve resource deadlocks such as those created by the scenario above. In one implementation, a method 500 for resolving a resource deadlock between processes is illustrated in FIG. 5. The functionality of the method 500 may be implemented as a method executed as instructions on a machine, where the instructions are embodied on a tangible, non-transitory machine-readable storage medium. The method 500 may start at step 502. The processes are configured to belong to process groups (step 504). Resources are allocated on behalf of the process groups to be assigned to respective processes within the process groups (step 506). A shared data structure is maintained that includes process records of each of the processes (step 508). A determination is made that a respective process is involved in a resource deadlock if the process group to which the process belongs to is involved in the resource deadlock (step 510). The method 500 ends (step 512).

It should be noted that, as termed herein, the resources 406A-N may comprise any hardware, software, physical or logical resources as commonly understood in the art. By way of non-limiting example, respective resources 406A-N may comprise processors (i.e., Central Processing Units (CPUs)), memory components, accelerator components, Graphical Processor Units (GPUs), storage components, and/or network components, and the like.

Shared Data Structure

In accordance with aspects of the present invention, the shared data structure consists of global properties and process records. The global properties may include properties such as the version of the data structure, a checksum of any form, numbers of records and various groupings of records, and aggregated state indicators. The process records may include a record for each process that is registered to the deadlock resolution mechanism, where the format of each record is depicted in Table 1:

TABLE 1

| Process ID | Process Group IDs | Process Priority | Process State | Record Update Timestamp |
|---|---|---|---|---|

In certain embodiments, the process identification (ID) comprises a unique identifier of the process registered to the deadlock resolution mechanism; the process group IDs may comprise a list of identifiers of group that the process belongs to; the process priority may comprise the priority of the process relative to other processes; and the process state may comprise a state assigned with state values. These state values may include: a claim state, indicating that the process should claim resources 406A-N; and a release state, indicating the process should release any currently assigned resources 406A-N and zero its resource claim value.

The data structure may be optimized for searching process records using any of the properties in the process records. Specifically, search in the data structure can be optimized for searching using process IDs and process group IDs. Moreover, the aggregated state indicators in the data structure can include various indicators that provide information on the collective state of the processes in the data structure, as will be further discussed. An example of assembled process records in the data structure is depicted in Table 2:

TABLE 2

| Process ID | Process Group IDs | Process Priority | Process State | Record Update Timestamp |
|---|---|---|---|---|
| Proc J | Grp A | 10 | Claim | T2 |
| Proc K | Grp B | 8 | Claim | T1 |
| Proc L | Grp A | 6 | Release | T4 |
| Proc M | Grp B | 2 | Release | T3 |

It should be noted that the data structure may support locking in a distributed environment, to synchronize access to and updating of the data structure by multiple process running on different hosts. Additionally, in implementations that use a shared file system to store the data structure, it may be possible to configure the file containing the data structure to be resident in the file system's distributed cache.

Time Durations

As will be discussed further in the algorithms proceeding, the following time durations are additionally defined. In some embodiments, a resource allocation time duration may be utilized. The resource allocation time duration comprises a duration to wait for a resource allocation by a process, from a time the request is submitted by the process to a time the allocation is ultimately fulfilled. Expiration of this time duration signifies the possibility of a resource deadlock. In some embodiments, a state inspection time duration may also be utilized. The state inspection time duration comprises a duration to wait for a next inspection of the process's state calculated by the deadlock resolution mechanism.

Process Priorities

In certain embodiments, for calculating a priority for a process, several methods may be implemented. A first method may include a user specified priority which is assigned to each process. In this case, if the user specified priorities are not unique, then a unique property may be added to the user specified priorities as a tiebreak between two conflicting priority values, such as a timestamp. Another method for calculating the priority of the process includes using the timestamp itself. For example, if there are no user specified priorities, then timestamps may be used as the process priorities. Possible timestamps that can be used include (a) a time when a process is first registered into the deadlock resolution mechanism; (b) a start time of the process; and/or (c) a time when a wait duration has elapsed. Generally, a process with an earlier timestamp can be considered as assigned with higher priority compared with a process with a later timestamp.

Deadlock Resolution Algorithm

Figure 6:
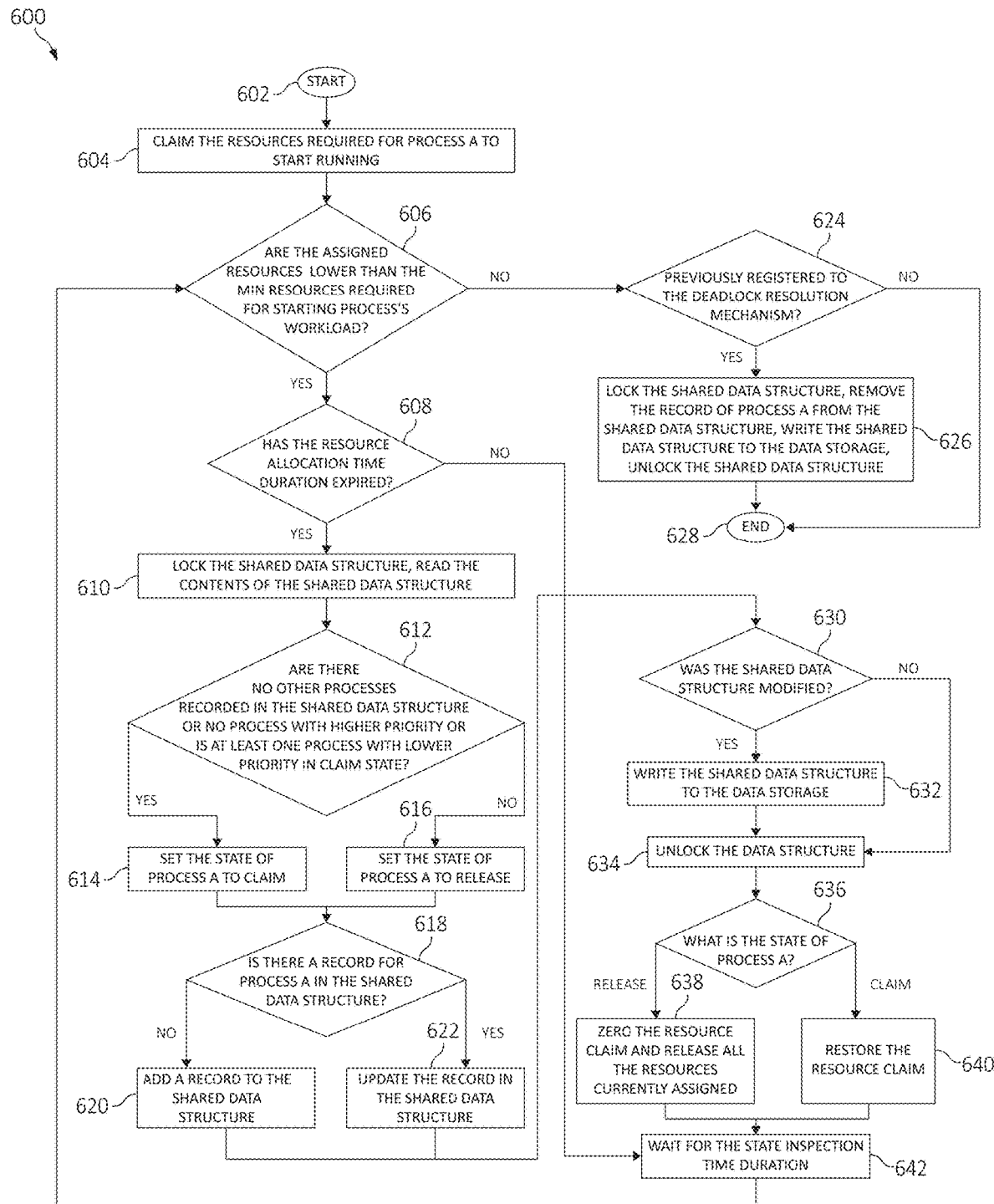
FIG. 6 is a flow chart diagram depicting a state-based algorithm for allocating resources to processes, according to embodiments of the present invention.

With the foregoing definitions and architectural overview described, FIG. 6 is a flow chart diagram depicting a state-based algorithm 600 for resolving deadlock between processes. The functionality of the algorithm 600 may be implemented as a method executed as instructions on a machine, where the instructions are embodied on a tangible, non-transitory machine-readable storage medium. The algorithm 600 may start at step 602. For a given process (e.g., "process A"), the resources (i.e., resources 406A-N) required for the given process are claimed to commence execution thereof (step 604). A determination is then made, at step 606, whether the resources currently assigned to the instant process are lower (i.e., in number, in performance, or other metrics) than minimum resources required for starting the process' workload. If, at step 606, the resources currently assigned to the instant process are not lower than required to commence execution of the process' workload, the algorithm 600 moves to step 624, where another determination is made as to whether the instant process was previously registered to the deadlock resolution mechanism. If, at step 624, the instant process was not previously registered to the deadlock resolution mechanism, the algorithm 600 ends (step 628). Otherwise, at step 624, if the process was previously registered to the deadlock resolution mechanism, the shared data structure is locked, the process record of the instant process is removed from the data structure, the data structure is written to the data storage, and the shared data structure is unlocked (step 626). Subsequently, the algorithm 600 ends (step 628).

Returning to step 606, if the resources currently assigned to the process are lower than required to commence execution of the instant process' workload, the algorithm 600 moves to step 608, where a determination is made as to whether the resource allocation duration time has expired. If, at step 608, the resource allocation time duration has not expired, the algorithm 600 continues to step 642, where the state inspection time duration is waited by the instant process, and then returns to step 606. Otherwise, at step 608, if the resource allocation time duration has expired, the algorithm 600 moves to step 610, where the shared data structure is locked and the contents thereof read by the instant process. The algorithm 600 then moves to step 612, where a determination is made as to whether no other processes exist in the shared data structure, or no other processes exist in the shared data structure having a higher priority relative to the instant process, or whether there exists at least one process having a lower priority relative with the instant process where the state of the lower priority process is the claim state (i.e., the lower priority process has not released its resources). If, at step 612, at least one of the conditions are true, the state of the instant process is set to the claim state such that additional resources are allocated to the instant process (step 614). Otherwise, at step 612, if none of the conditions are true, the state of the instant process is set to the release state such that currently assigned resources of the process are deallocated and released for claiming by other processes (step 616).

Notwithstanding whether the state of the process is set to the claim state or the release state, the algorithm then moves to step 618, where a determination is made as to whether a process record exists for the instant process in the shared data structure. If, at step 618, no process record exists for the instant process in the shared data structure, a process record is added to the shared data structure for the instant process (step 620). Otherwise, at step 618, if a process record already exists for the instant process in the shared data structure, the process record is updated for the instant process in the shared data structure (step 622). Once the process record has been added or updated, the algorithm 600 then moves to step 630, where a determination is made as to whether the shared data structure has been modified. If the shared data structure was modified at step 630, the shared data structure is written to the data storage (step 632) and the shared data structure is then unlocked (step 634). Otherwise, at step 630, if the shared data structure was not modified, the shared data structure is merely unlocked (step 634).

Subsequent to unlocking the shared data structure at step 634, a determination is made as to the state of the instant process (step 636). If the instant process is in the claim state, the resource claim for the instant process is restored (step 640). Otherwise, at step 636, if the state of the process is in the release state, the resource claim of the instant process is zeroed out and all currently assigned resources to the instant process are released (step 638). The algorithm 600 then waits for the state inspection time duration at step 642 and iterates by returning to step 606 to begin the algorithm 600 anew.

Figure 7:
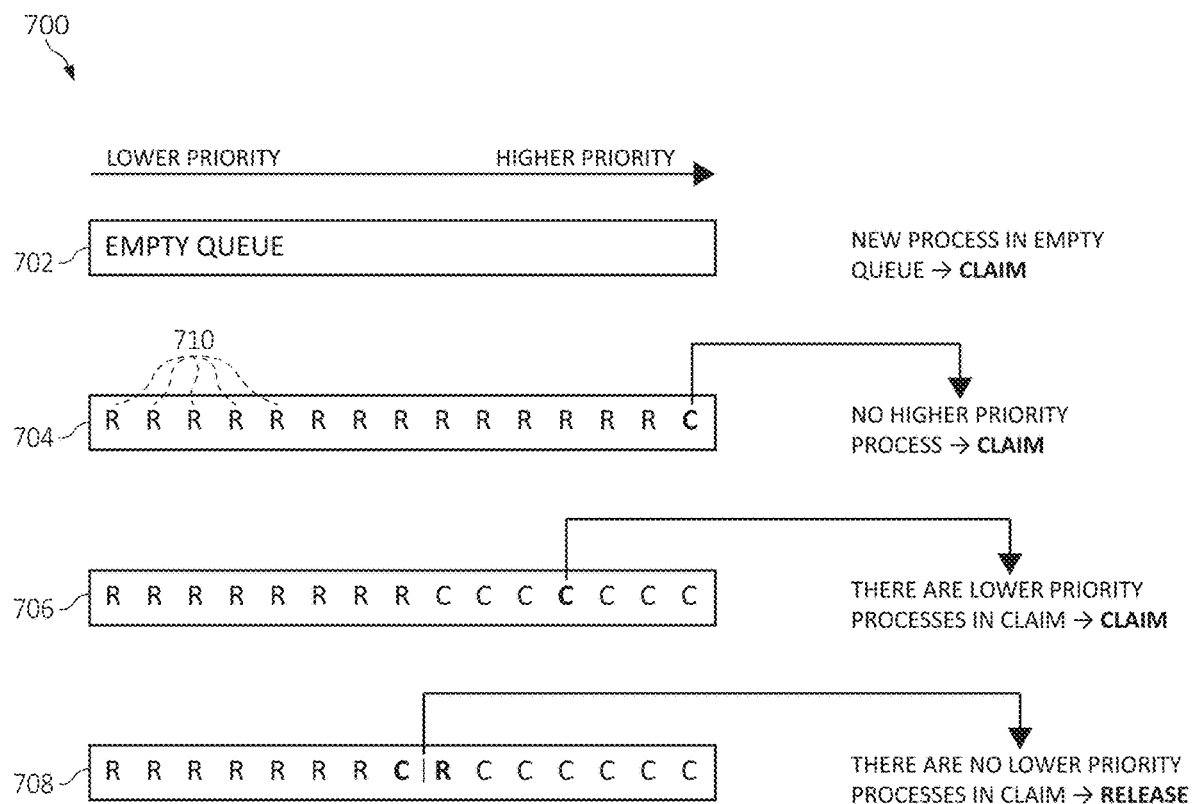
FIG. 7 is a block diagram depicting a process priority-based algorithm for allocating resources to processes, according to embodiments of the present invention.

With the foregoing priority-based algorithm in view, FIG. 7 is a block diagram depicting a simplified analysis 700 of the various priority-based decisions according to the process states. As illustrated in the analysis 700, if an empty queue exists, any new process which is entered into the empty queue is placed in the claim state, as shown by line 702. If an instant process exists in a queue in which no higher priority processes exist (i.e., each of the processes in the queue have a lower priority than the instant process), the instant process is placed in the claim state, as shown by line 704. If an instant process exists in a queue in which there is at least one lower priority process in the claim state, the instant process is placed in the claim state, as shown by line 706. Finally, if an instant process exists in a queue in which no lower priority processes exist which are in the claim state, the instant process is placed in the release state.

The aforementioned priority-based algorithm is further specified in the following pseudo-code procedure:

```
Claim the resources required for process A to start running.
While [the resources currently assigned to process A are lower than the minimum resources
required for starting process A's workload] {
    If [the resource allocation time duration has expired] then {
        Lock the shared data structure.
        Read the contents of the shared data structure.
        If [(there are no other processes recorded in the shared data structure) OR (there
        is no other process with higher priority compared with process A) OR (there is at least
        one process with lower priority compared with process A and the state of that process is
        Claim (i.e. the process has not released its resources))] then {
            Set the state of process A to Claim.
        } else {
            Set the state of process A to Release.
        }
        If [there is no record for process A in the shared data structure] then {
            Add a record for process A to the shared data structure.
        } else {
            Update the record of process A in the shared data structure.
        }
        If [the shared data structure has been modified] then {
            Write the shared data structure to the date storage.
        }
        Unlock the data structure.
        if [the state of process A is Release] then {
            Zero the resource claim of process A.
            Release all the resources currently assigned to process A.
        }
        If [the state of process A is Claim] then {
            Restore the resource claim of process A.
        }
    }
    Wait for the state inspection time duration.
}
If [process A has been previously registered to the deadlock resolution mechanism] then {
    Lock the shared data structure.
    Remove the record of process A from the shared data structure.
    Write the shared data structure to the date storage.
    Unlock the shared data structure.
}
```

Aggregated State-Based Algorithm

In some embodiments, an aggregated state-based optimization may be applied to the deadlock resolution mechanism. With this optimization the calculated state of a process is fine-tuned according to an aggregated state of the queue holding the processes that are currently involved in the deadlock situation.

For example, in cases where it's possible to choose between the claim and release states, the algorithm may use an aggregated state as a consideration in determining the state of the process. In other words, this procedure analyzes the state of all processes in the queue in aggregate to determine which of the states to place respective processes in. In some examples, if the aggregated state indicates that the number of processes involved in the deadlock queue is increasing or not changing, namely the deadlock is still not on the path of resolution, then the process state may be selected to be in the release state. If the aggregated state indicates that the number of processes involved in the deadlock queue is decreasing, namely the deadlock is on the path of resolution, then the process state is selected to be in the claim state.

Several options exist for implementing an aggregated state aspect to indicate if the deadlock queue is increasing or decreasing in size. In one example, the difference in the queue size over a last time interval may be used, such that if the queue size increased over the last time interval then the indication is "increasing". Similarly, if the queue size decreased over the last time interval then the indication is "decreasing". If the queue size has not changed over the last time interval then the indication is "not changed".

In another example, the last update operation performed on the deadlock queue may be used, such that if the last update operation comprised adding a process to the queue, then the indication is "increasing". Similarly, if the last update operation comprised removing a process from the queue then the indication is "decreasing".

The aggregated state aspect indicating if the deadlock queue is increasing or decreasing can be stored in the shared data structure, and maintained in accordance with the method selected for its calculation, and again, the values of this aggregated state aspect may comprise an increasing state, indicating that the size of the deadlock queue is increasing; a decreasing state, indicating that the size of the deadlock queue is decreasing; and/or a NoChange state, indicating that the size of the deadlock queue has not changed.

Figure 8:
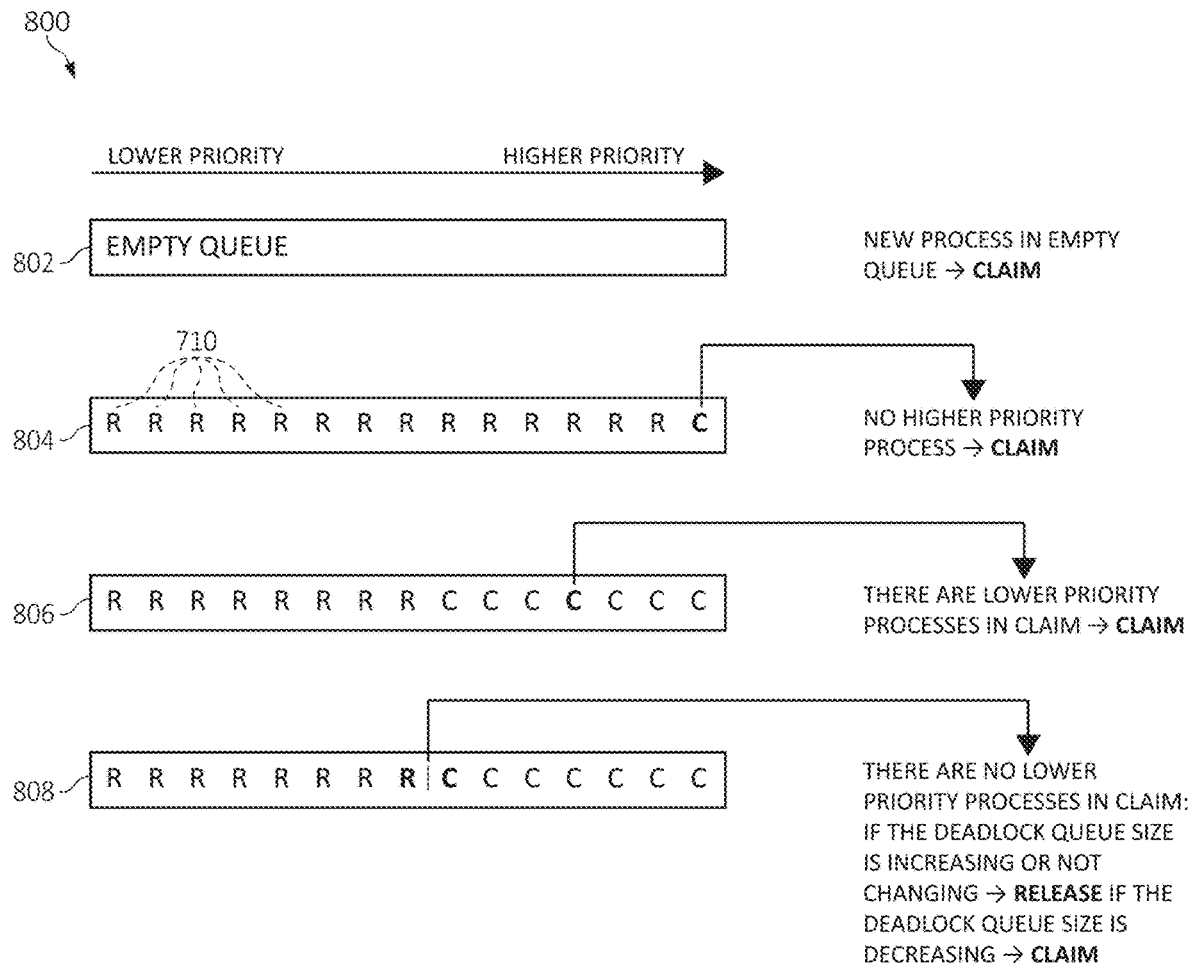
FIG. 8 is a block diagram depicting an aggregated state-based algorithm for allocating resources to processes, according to embodiments of the present invention.

FIG. 8 depicts a block diagram depicting a simplified analysis 800 of the various aggregated state-based decisions according to the process states. As illustrated in the analysis 800, and much like the analysis 700, if an empty queue exists, any new process which is entered into the empty queue is placed in the claim state, as shown by line 802. If an instant process exists in a queue in which no higher priority processes exist (i.e., each of the processes in the queue have a lower priority than the instant process), the instant process is placed in the claim state, as shown by line 804. If an instant process exists in a queue in which there is at least one lower priority process in the claim state, the instant process is placed in the claim state, as shown by line 806. However, if an instant process exists in a queue in which it is possible to choose whether to place the instant process in the claim state or the release state, the aggregated state-based decision may be employed. Specifically, if no lower priority processes exist in the claim state in the queue, if the queue size, according to the aggregated state-based computation, is in the increasing state or in the NoChange state, the instant process is placed in the release state to free its resources. Otherwise, if the queue size, according to the aggregated state-based computation, is in the decreasing state, the instant process is placed in the claim state, as shown by line 808.

To implement this optimization, a modification to the pseudo-code procedure specified above is applied as follows:

```
Claim the resources required for process A to start running.
While [the resources currently assigned to process A are lower than the minimum resources
required for starting process A's workload] {
If [the resource allocation time duration has expired] then {
    Lock the shared data structure.
    Read the contents of the shared data structure.
    If [(there are no other processes recorded in the shared data structure) OR (there
is no other process with higher priority compared with process A) OR (there is at least
one process with lower priority compared with process A and the state of that process is
Claim)] then {
        Set the state of process A to Claim.
    } else if [the global state value is Increasing or NoChange] then {
        Set the state of process A to Release.
    } else { // the aggregated state value is Decreasing
        Set the state of process A to Claim.
    }
    If [there is no record for process A in the shared data structure] then {
        Add a record for process A to the shared data structure.
    } else {
        Update the record of process A in the shared data structure.
    }
    If [the shared data structure has been modified] then {
        Write the shared data structure to the date storage.
    }
    Unlock the data structure.
        if [the state of process A is Release] then {
            Zero the resource claim of process A.
            Release all the resources currently assigned to process A.
        }
        If [the state of process A is Claim] then {
            Restore the resource claim of process A.
        }
    }
    Wait for the state inspection time duration.
}
If [process A has been previously registered to the deadlock resolution mechanism] then {
    Lock the shared data structure.
    Remove the record of process A from the shared data structure.
    Write the shared data structure to the date storage.
    Unlock the shared data structure.
}
```

Process Groups-Based Algorithm

In some embodiments, an optimization to the above algorithm is to add further information on the possible involvement of a process in a deadlock situation using additional information beyond the expiration of a resource allocation time duration.

Particularly, in an architecture where processes belong to process groups, and resources are allocated on behalf of process groups to be assigned to their respective processes, then if a process group in involved in a deadlock situation, this infers that all the processes in that group are involved in a deadlock situation. Namely, if one process of a process group is currently involved in a deadlock situation, then other processes in this process group can determine that they are involved in a deadlock situation without waiting for the resource allocation time duration to expire.

To facilitate this logic, a process group search structure is added to the shared data structure, where the process group search structure includes all the identifiers of the process groups of the processes registered in the shared data structure. Further, the process group search structure is searchable given an identifier of a group to search for. In various embodiments, the process group search structure may be built in memory from the process records in the shared data structure, and may or may not be persisted.

Figure 9:
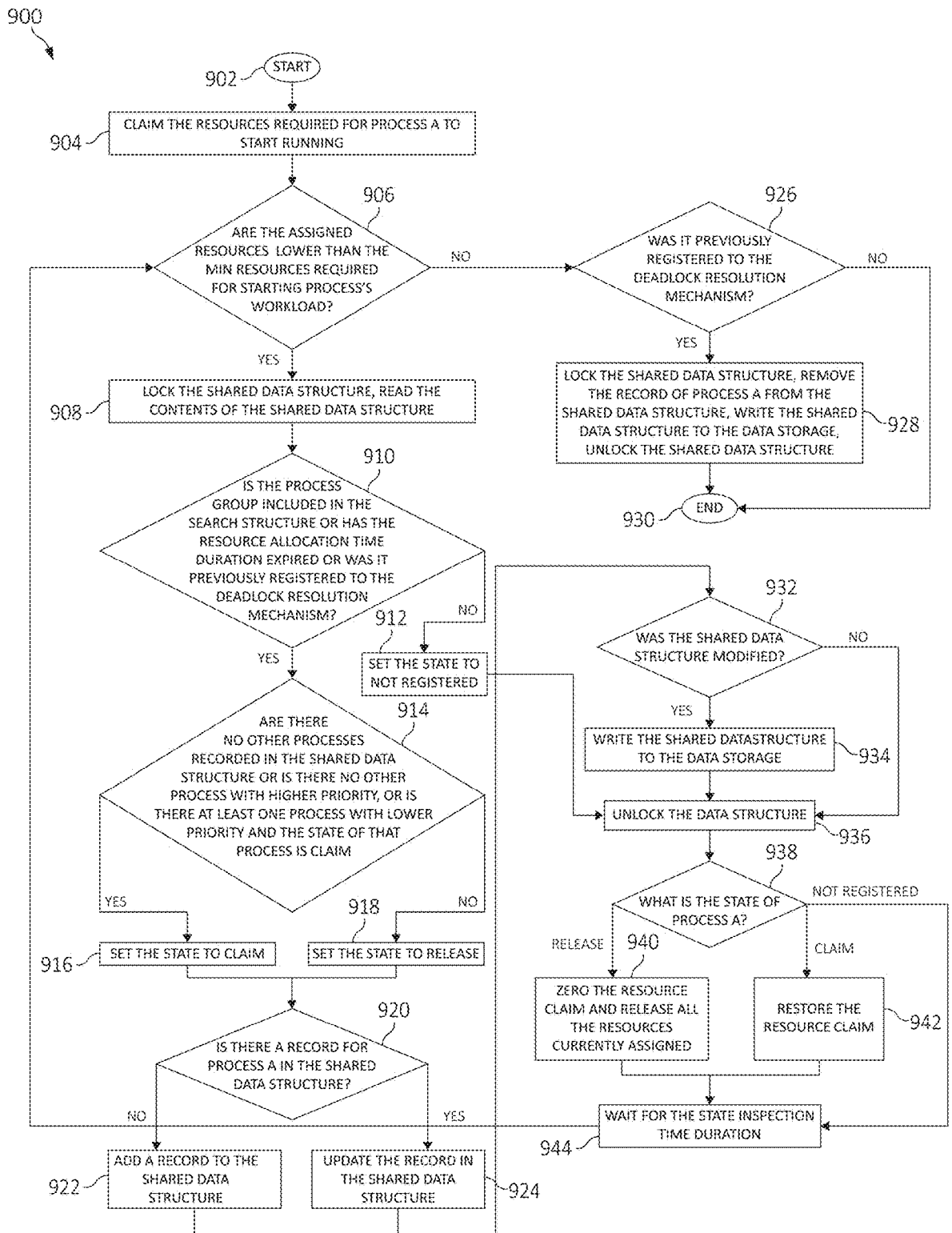
FIG. 9 is a flow chart diagram depicting a process group-based algorithm for allocating resources to processes, according to embodiments of the present invention.

FIG. 9 is a flow chart diagram depicting the aforementioned process group-based algorithm 900 for resolving deadlock between processes. The functionality of the algorithm 900 may be implemented as a method executed as instructions on a machine, where the instructions are embodied on a tangible, non-transitory machine-readable storage medium. The algorithm 900 may start at step 902. For a given process (e.g., "process A"), the resources (i.e., resources 406A-N) required for the given process are claimed to commence execution thereof (step 904). A determination is then made, at step 906, whether the resources currently assigned to the instant process are lower (i.e., in number, in performance, or other metrics) than minimum resources required for starting the process' workload. If, at step 906, the resources currently assigned to the instant process are not lower than required to commence execution of the process' workload, the algorithm 900 moves to step 926, where another determination is made as to whether the instant process was previously registered to the deadlock resolution mechanism. If, at step 926, the instant process was not previously registered to the deadlock resolution mechanism, the algorithm 900 ends (step 930). Otherwise, at step 926, if the process was previously registered to the deadlock resolution mechanism, the shared data structure is locked, the process record of the instant process is removed from the shared data structure, the shared data structure is written to data storage, and the shared data structure is unlocked (step 928). Subsequently, the algorithm 900 ends (step 930).

Returning to step 906, if the resources currently assigned to the instant process are lower than required to commence execution of the instant process' workload, the algorithm 900 moves to step 908, where the shared data structure is locked and the contents thereof read by the instant process. Subsequently, a determination is made at step 910 as to whether the process group to which the instant process belongs to is included in the process group search structure; or the resource allocation time duration expired; or whether the instant process was previously registered to the deadlock resolution mechanism. If all of the conditions at step 910 are not true, the state of the process is set to not-registered (step 912) and the shared data structure is unlocked (step 936).

Subsequent to unlocking the shared data structure at step 936, a determination is made as to the state of the instant process (step 938). If the state of the instant process is not registered, the algorithm moves to wait for the state inspection time duration (step 944) and subsequently returns to step 906. If the instant process is in the claim state, the resource claim for the instant process is restored (step 942). Otherwise, at step 938, if the instant process is in the release state, the resource claim of the instant process is zeroed out and all currently assigned resources to the instant process are released (step 940). The algorithm 900 then waits for the state inspection time duration at step 944 and iterates by returning to step 906 to begin the algorithm 900 anew.

Returning to step 910, if any of the conditions are true, the algorithm 900 moves to another determination, at step 914, as to whether no other processes exist in the shared data structure, or no other processes exist in the shared data structure having a higher priority relative to the instant process, or whether there exists at least one process having a lower priority relative with the instant process where the state of the lower priority process is in the claim state (i.e., the lower priority process has not released its resources). If, at step 914, at least one of the conditions are true, the state of the instant process is set to the claim state such that additional resources are allocated to the instant process (step 916). Otherwise, at step 914, if none of the conditions are true, the state of the instant process is set to the release state such that currently assigned resources of the process are deallocated and released for claiming by other processes (step 918).

Notwithstanding whether the state of the process is set to the claim state or the release state, the algorithm then moves to step 920, where a determination is made as to whether a process record exists for the instant process in the shared data structure. If, at step 920, no process record exists for the instant process in the shared data structure, a process record is added to the shared data structure for the instant process (step 922). Otherwise, at step 920, if a process record already exists for the instant process in the shared data structure, the process record is updated for the instant process in the shared data structure (step 924). Once the process record has been added or updated, the algorithm 900 then moves to step 932, where a determination is made as to whether the shared data structure has been modified. If the shared data structure was modified at step 932, the shared data structure is written to the data storage (step 934) and the shared data structure is then unlocked (step 936). Otherwise, at step 932, if the shared data structure was not modified, the shared data structure is merely unlocked (step 936).

Subsequent to unlocking the shared data structure at step 936, a determination is made as to the state of the instant process (step 938). If the instant process is in the claim state, the resource claim for the instant process is restored (step 942). Otherwise, at step 938, if the state of the process is in the release state, the resource claim of the instant process is zeroed out and all currently assigned resources to the instant process are released(step 940). The algorithm 900 then waits for the state inspection time duration at step 944 and iterates by returning to step 906 to begin the algorithm 900 anew.

The aforementioned process group-based algorithm is further specified in the following pseudo-code procedure:

```
Claim the resources required for process A to start running.
While [the resources currently assigned to process A are lower than the minimum resources
required for starting process A's workload] {
    Lock the shared data structure.
    Read the contents of the shared data structure.
    If [(the process group that process A belongs to is included in the process group search
    structure) OR (the resource allocation time duration has expired) OR (process A was
    previously registered to the deadlock resolution mechanism)] then {
        If [(there are no other processes recorded in the shared data structure) OR (there
        is no other process with higher priority compared with process A) OR (there is at least
        one process with lower priority compared with process A and the state of that process is
        Claim (i.e. the process has not released its resources))] then {
            Set the state of process A to Claim.
        } else {
            Set the state of process A to Release.
        }
        If [there is no record for process A in the shared data structure] then {
            Add a record for process A to the shared data structure.
        } else {
            Update the record of process A in the shared data structure.
        }
        If [the shared data structure has been modified] then {
            Write the shared data structure to the date storage.
        }
```

```
    } else {
        Set the state of process A to NotRegistered.
    }
    Unlock the data structure.
    if [the state of process A is Release] then {
        Zero the resource claim of process A.
        Release all the resources currently assigned to process A.
    }
    If [the state of process A is Claim] then {
        Restore the resource claim of process A.
    }
    Wait for the state inspection time duration.
}
If [process A has been previously registered to the deadlock resolution mechanism] then {
    Lock the shared data structure.
    Remove the record of process A from the shared data structure.
    Write the shared data structure to the date storage.
    Unlock the shared data structure.
}
```

Removing Obsolete Records

In various embodiments, there may be cases where a process registers itself into the shared data structure, and at some later point terminates abnormally before removing its process record from the shared data structure. These cases may create obsolete process records in the shared data structure.

To handle obsolete process records, a time duration is defined to determine if a process record is obsolete. In particular, each process record includes a record update timestamp, that indicates the last time when the record was updated. For each process record, a time duration from its last update may be calculated as the difference between the current time and the record update timestamp. The process record's time duration from its last update is then compared with the defined time duration for determining if the process record is obsolete. If the process record's time duration from its last update is larger than the defined time duration, the record is considered obsolete.

Process records identified as being obsolete may then be removed from the shared data structure. In some embodiments, this calculation of obsolete process records may be performed whenever the shared data structure is loaded from storage. In cases where a process record is identified as obsolete and removed from the shared data structure, however the process which is associated with that process record is still running, then in the next iteration in which the process checks the shared data structure, a new record may be added for that process to the shared data structure.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:
1. A method for resolving a resource deadlock between processes, by a processor, comprising:
configuring the processes to belong to process groups;
allocating resources on behalf of the process groups to be assigned to respective processes within the process groups;
maintaining a shared data structure that includes process records of each of the processes; and
determining that a respective process is involved in a resource deadlock if the process group to which the process belongs to is involved in the resource deadlock, wherein the process group is determined as involved in the resource deadlock if any of the respective processes within the process group have an associated process record included in the shared data structure.

2. The method of claim 1, further including avoiding, by the process, waiting for a resource allocation time duration if the process determines that the process group to which the process belongs to is involved in the resource deadlock.

3. The method of claim 1, further including maintaining a process group search structure in the shared data structure, the process group search structure generated in memory from the process records in the shared data structure, wherein at least one of:
the process group search structure includes identifiers of the process groups of the processes registered in the shared data structure; and
the process group search structure is searchable given one of the identifiers of the process groups to search for.

4. The method of claim 1, wherein:
each process record includes at least one of a process identifier, a process priority, and a process state;
the process identifier comprises an identifier of the process registered in the shared data structure;
the process priority comprises a priority of the process relative to other processes; and
the process state is configured to be assigned with state values that include at least:
a claim state, indicating that the process should claim the resources;
a release state, indicating that the process should zero a resource claim value associated with the process and release any resources allocated to the process; and
a not registered state, indicating that the process is not registered in the shared data structure.

5. The method of claim 4, further including performing at least one of:
determining, by the process, whether a number of currently allocated resources to the respective process is lower than a minimum number of resources required for commencing a workload of the process;
reading, by the process, the process records of the shared data structure;
determining, by the process, if the process group that the process belongs to is included in the process group search structure in the shared data structure, or a resource allocation time duration has expired, or the process was previously registered in the shared data structure;
adding a new process record for the process to the shared data structure if no process record exists for the process;
updating the process record of the process in the shared data structure if there exists a process record for the process in the shared data structure,
writing the shared data structure to a data storage if the shared data structure has been modified;

waiting for a state inspection time duration and reiterating the determination of the respective state of the process; and removing the process record of the process from the shared data structure and writing the shared data structure to the data storage if the process has been allocated with sufficient resources required for commencing the workload and the process has been previously registered to the shared data structure.

6. The method of claim 1, further including removing obsolete process records from the shared data structure by at least one of:

defining an obsolete time duration to determine if a process record is obsolete;

including a record update timestamp in each process record indicating a last time when the process record was updated;

computing, for each process record, an update time duration from the last time when the process record was updated as a difference between a current time and the record update timestamp;

comparing the update time duration with the defined obsolete time duration for determining if the process record is obsolete; wherein the process record is obsolete if the update time duration is larger than the obsolete time duration;

removing the process record from the shared data structure if the process record is determined to be obsolete; and performing the computation of obsolete process records when the shared data structure is loaded from a storage.

7. A system for resolving a resource deadlock between processes, comprising:

a processor executing instructions stored in a memory device; wherein the processor:

configures the processes to belong to process groups;

allocates resources on behalf of the process groups to be assigned to respective processes within the process groups;

maintains a shared data structure that includes process records of each of the processes; and determines that a respective process is involved in a resource deadlock if the process group to which the process belongs to is involved in the resource deadlock, wherein the process group is determined as involved in the resource deadlock if any of the respective processes within the process group have an associated process record included in the shared data structure.

8. The system of claim 7, wherein the processor avoids, by the process, waiting for a resource allocation time duration if the process determines that the process group to which the process belongs to is involved in the resource deadlock.

9. The system of claim 7, wherein the processor maintains a process group search structure in the shared data structure, the process group search structure generated in memory from the process records in the shared data structure, wherein at least one of:

the process group search structure includes identifiers of the process groups of the processes registered in the shared data structure; and the process group search structure is searchable given one of the identifiers of the process groups to search for.

10. The system of claim 7, wherein:

each process record includes at least one of a process identifier, a process priority, and a process state;

the process identifier comprises an identifier of the process registered in the shared data structure;

the process priority comprises a priority of the process relative to other processes; and the process state is configured to be assigned with state values that include at least:

a claim state, indicating that the process should claim the resources;

a release state, indicating that the process should zero a resource claim value associated with the process and release any resources allocated to the process; and a not registered state, indicating that the process is not registered in the shared data structure.

11. The system of claim 10, wherein the processor performs at least one of:

determining, by the process, whether a number of currently allocated resources to the respective process is lower than a minimum number of resources required for commencing a workload of the process;

reading, by the process, the process records of the shared data structure;

determining, by the process, if the process group that the process belongs to is included in the process group search structure in the shared data structure, a resource allocation time duration has expired, or the process was previously registered in the shared data structure;

adding a new process record for the process to the shared data structure if no process record exists for the process;

updating the process record of the process in the shared data structure if there exists a process record for the process in the shared data structure;

writing the shared data structure to a data storage if the shared data structure has been modified;

waiting for a state inspection time duration and reiterating the determination of the respective state of the process; and removing the process record of the process from the shared data structure and writing the shared data structure to the data storage if the process has been allocated with sufficient resources required for commencing the workload and the process has been previously registered to the shared data structure.

12. The system of claim 7, wherein the processor removes obsolete process records from the shared data structure by at least one of:

defining an obsolete time duration to determine if a process record is obsolete;

including a record update timestamp in each process record indicating a last time when the process record was updated;

computing, for each process record, an update time duration from the last time when the process record was updated as a difference between a current time and the record update timestamp;

comparing the update time duration with the defined obsolete time duration for determining if the process record is obsolete; wherein the process record is obsolete if the update time duration is larger than the obsolete time duration;

removing the process record from the shared data structure if the process record is determined to be obsolete; and performing the computation of obsolete process records when the shared data structure is loaded from a storage.

13. A computer program product for resolving a resource deadlock between processes, the computer program product comprising a non-transitory computer-readable storage medium having computer-readable program code portions stored therein, the computer-readable program code portions comprising:
an executable portion that configures the processes to belong to process groups;
an executable portion that allocates resources on behalf of the process groups to be assigned to respective processes within the process groups;
an executable portion that maintains a shared data structure that includes process records of each of the processes; and
an executable portion that determines that a respective process is involved in a resource deadlock if the process group to which the process belongs to is involved in the resource deadlock, wherein the process group is determined as involved in the resource deadlock if any of the respective processes within the process group have an associated process record included in the shared data structure.

14. The computer program product of claim 13, further including an executable portion that avoids, by the process, waiting for a resource allocation time duration if the process determines that the process group to which the process belongs to is involved in the resource deadlock.

15. The computer program product of claim 13, further including an executable portion that maintains a process group search structure in the shared data structure, the process group search structure generated in memory from the process records in the shared data structure, wherein at least one of:
the process group search structure includes identifiers of the process groups of the processes registered in the shared data structure; and
the process group search structure is searchable given one of the identifiers of the process groups to search for.

16. The computer program product of claim 13, wherein:
each process record includes at least one of a process identifier, a process priority, and a process state;
the process identifier comprises an identifier of the process registered in the shared data structure;
the process priority comprises a priority of the process relative to other processes; and
the process state is configured to be assigned with state values that include at least:
a claim state, indicating that the process should claim the resources;
a release state, indicating that the process should zero a resource claim value associated with the process and release any resources allocated to the process; and
a not registered state, indicating that the process is not registered in the shared data structure.

17. The computer program product of claim 16, further including an executable portion that performs at least one of:
determining, by the process, whether a number of currently allocated resources to the respective process is lower than a minimum number of resources required for commencing a workload of the process;
reading, by the process, the process records of the shared data structure;
determining, by the process, if the process group that the process belongs to is included in the process group search structure in the shared data structure, a resource allocation time duration has expired, or the process was previously registered in the shared data structure;
adding a new process record for the process to the shared data structure if no process record exists for the process;
updating the process record of the process in the shared data structure if there exists a process record for the process in the shared data structure;
writing the shared data structure to a data storage if the shared data structure has been modified;
waiting for a state inspection time duration and reiterating the determination of the respective state of the process; and
removing the process record of the process from the shared data structure and writing the shared data structure to the data storage if the process has been allocated with sufficient resources required for commencing the workload and the process has been previously registered to the shared data structure.

18. The computer program product of claim 13, further including an executable portion that removes obsolete process records from the shared data structure by at least one of:
defining an obsolete time duration to determine if a process record is obsolete;
including a record update timestamp in each process record indicating a last time when the process record was updated;
computing, for each process record, an update time duration from the last time when the process record was updated as a difference between a current time and the record update timestamp;
comparing the update time duration with the defined obsolete time duration for determining if the process record is obsolete; wherein the process record is obsolete if the update time duration is larger than the obsolete time duration;
removing the process record from the shared data structure if the process record is determined to be obsolete; and
performing the computation of obsolete process records when the shared data structure is loaded from a storage.

* * * * *